US 8,839,113 B2

(12) United States Patent
Hamilton et al.

(10) Patent No.: US 8,839,113 B2
(45) Date of Patent: Sep. 16, 2014

(54) METHOD FOR BRIDGING MULTIPLE NETWORK VIEWS

(75) Inventors: David B. Hamilton, Milpitas, CA (US);
Sesh Sayani, San Jose, CA (US);
Naveen Konapalli, San Ramon, CA (US); Suresh Muthu, San Jose, CA (US); Vineet Banga, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 541 days.

(21) Appl. No.: 13/281,602

(22) Filed: Oct. 26, 2011

(65) Prior Publication Data

US 2013/0111374 A1 May 2, 2013

(51) Int. Cl.
*G06F 3/00* (2006.01)
*G06F 13/00* (2006.01)
*G09G 5/00* (2006.01)
*H04L 12/24* (2006.01)
*H04L 12/26* (2006.01)

(52) U.S. Cl.
CPC ............ *H04L 41/12* (2013.01); *H04L 12/2602* (2013.01); *H04L 41/22* (2013.01)
USPC ............ 715/734; 715/763; 709/223; 709/224

(58) Field of Classification Search
CPC ...... H04L 12/2602; H04L 41/22; H04L 41/12
USPC ............................ 715/763, 734; 709/223, 224
See application file for complete search history.

(56) References Cited

U.S. PATENT DOCUMENTS

| | | | | |
|---|---|---|---|---|
| 5,295,244 A | * | 3/1994 | Dev et al. | 715/853 |
| 5,504,921 A | * | 4/1996 | Dev et al. | 709/223 |
| 5,559,955 A | * | 9/1996 | Dev et al. | 714/4.12 |
| 5,812,750 A | * | 9/1998 | Dev et al. | 714/4.12 |
| 5,848,243 A | * | 12/1998 | Kulkarni et al. | 709/224 |
| 5,926,463 A | * | 7/1999 | Ahearn et al. | 370/254 |
| 6,049,828 A | * | 4/2000 | Dev et al. | 709/224 |
| 6,208,324 B1 | * | 3/2001 | Sundstrom et al. | 715/846 |
| 6,477,572 B1 | * | 11/2002 | Elderton et al. | 709/224 |
| 6,505,245 B1 | * | 1/2003 | North et al. | 709/223 |
| 6,732,170 B2 | * | 5/2004 | Miyake et al. | 709/223 |
| 6,941,518 B2 | * | 9/2005 | French et al. | 715/736 |
| 7,019,753 B2 | * | 3/2006 | Rappaport et al. | 345/582 |
| 7,089,116 B2 | * | 8/2006 | Smith | 702/3 |
| 7,149,975 B1 | * | 12/2006 | Johnson et al. | 715/734 |
| 7,225,117 B1 | * | 5/2007 | Feldstein et al. | 703/21 |
| 7,315,985 B1 | * | 1/2008 | Gauvin et al. | 715/734 |
| 7,430,593 B2 | * | 9/2008 | Baldwin et al. | 709/223 |
| 7,681,130 B1 | * | 3/2010 | Lavallee et al. | 715/735 |

(Continued)

OTHER PUBLICATIONS

Krauter et al., A taxonomy and survey of grid resource management systems for distributed computing, 2002, Wiley Online Library.*

*Primary Examiner* — Jordany Nunez
(74) *Attorney, Agent, or Firm* — Wong, Cabello, Lutsch, Rutherford & Brucculeri, L.L.P.

(57) ABSTRACT

Embodiments which utilize a topology view GUI with elements in each of storage and general network views which indicate the connection to the alternate network via an icon. Properly selecting the icon causes the topology view of the other network to appear. This method allows the connections between the networks to be readily viewed without cluttering either topology and allows quick context changes to occur at the same point.

12 Claims, 13 Drawing Sheets

(56) References Cited

U.S. PATENT DOCUMENTS

| | | | |
|---|---|---|---|
| 7,720,050 B1* | 5/2010 | Blank | 370/352 |
| 7,853,880 B2* | 12/2010 | Porter | 715/734 |
| 7,917,854 B1* | 3/2011 | Beaudoin et al. | 715/734 |
| 7,975,043 B2* | 7/2011 | Douglas et al. | 709/224 |
| 8,185,640 B2* | 5/2012 | Nag et al. | 709/228 |
| 8,577,911 B1* | 11/2013 | Stepinski et al. | 707/765 |
| 2001/0042118 A1* | 11/2001 | Miyake et al. | 709/223 |
| 2002/0143938 A1* | 10/2002 | Alexander et al. | 709/224 |
| 2004/0061701 A1* | 4/2004 | Arquie et al. | 345/440 |
| 2004/0172466 A1* | 9/2004 | Douglas et al. | 709/224 |
| 2005/0232164 A1* | 10/2005 | Anzarouth et al. | 370/255 |
| 2006/0168170 A1* | 7/2006 | Korzeniowski | 709/223 |
| 2007/0206512 A1* | 9/2007 | Hinds et al. | 370/254 |
| 2007/0229350 A1* | 10/2007 | Scalisi et al. | 342/350 |
| 2008/0155094 A1* | 6/2008 | Roese et al. | 709/224 |
| 2008/0201454 A1* | 8/2008 | Soffer | 709/220 |
| 2010/0325293 A1* | 12/2010 | Nag et al. | 709/228 |
| 2011/0188378 A1* | 8/2011 | Collins et al. | 370/236 |
| 2012/0239824 A1* | 9/2012 | Nguyen et al. | 709/246 |
| 2013/0246502 A1* | 9/2013 | Thorvaldsen et al. | 709/202 |

\* cited by examiner

METHOD FOR BRIDGING MULTIPLE NETWORK VIEWS

BACKGROUND OF THE INVENTION

1. Field of the Invention

The invention relates to network management, and particularly to network management using topology views, and more particularly to network management of multiple, connected networks having different protocols using a single network manager with multiple topology views.

2. Description of the Prior Art

Computer networks are becoming more complicated with each passing moment. This is due in large part to the increased complexity and capability of the networks. This increased complexity and capability is in turn due to larger number of elements, such as switches and routers, and to the capabilities of each element.

One area where this is occurring is in the data center. Typically data centers have had two separate networks, one for general networking and one for storage. The general networking was done over Ethernet networks, typically having three layers, edge, aggregation and core, to interconnect individual computers to servers. The storage was done using Fibre Channel (FC) networks, where servers or hosts were connected to storage units.

Because of the separate nature of the two networks and the different protocols, each has managed independently. Local area network (LAN) administrations would manage the Ethernet network, while storage administrators would manage the FC networks.

Conventionally the management was done either using a command line interface (CLI) on each device or using a network manager program. The CLI approach had the greatest flexibility and capability but at the expense of a long learning curve. Various graphical user interface (GUI) techniques were also used, primarily either in a tree format or a topology format. The tree format allowed easier access to the individual devices but at the expense of more difficulty in understanding the network as a whole. The topology format excelled at understanding the network as a whole but at the expense of the individual device.

Recent changes in data center networking have greatly complicated data center network management. The first complication has been the development of the Fibre Channel over Ethernet (FCoE) protocol. This protocol uses FC logic and control methods but over an Ethernet physical layer. A gateway device connects the previously separate Ethernet LAN and the FC SAN (storage area network). FCoE has allowed a much greater number of hosts to have direct access to the SAN storage units. However, management of the Ethernet and FC networks has still been separated, though they are interconnected.

The second change has been the development of Ethernet fabrics, where multiple paths are developed with an Ethernet physical or L2 layer, as opposed to the prior single path spanning tree protocol (STP). Now the data center networks can become flatter L2 networks, doing away with the three-tier structure for peer-to-peer operations on the same layer.

Combining these two new advances, FCoE and Ethernet fabrics, into a single network has further compounded management problems. FCoE has required combined management of the formally distinct networks for general communications and storage, while Ethernet fabrics have greatly added to the number of devices at one layer on the network. These management problems have stretched the preferred topology view management tools to complexity levels which obscure the networks, obviating the primary advantage of the topology view for management.

It would be desirable to have a GUI, topology view management technique which addressed the combined networks and large number of devices in one layer in a more intuitive, easy to manage manner.

BRIEF SUMMARY OF THE INVENTION

Embodiments, according to the present invention, utilize a topology view GUI with elements in each of the storage and general network views which indicate the connection to the alternate network via an icon. Properly selecting the icon causes the topology view of the other network to appear. This method allows the connections between the networks to be readily viewed without cluttering either topology and allows quick context changes to occur at the same point. Therefore the topology view remains a useful management tool.

DETAILED DESCRIPTION OF THE PREFERRED EMBODIMENT

Figure 1:
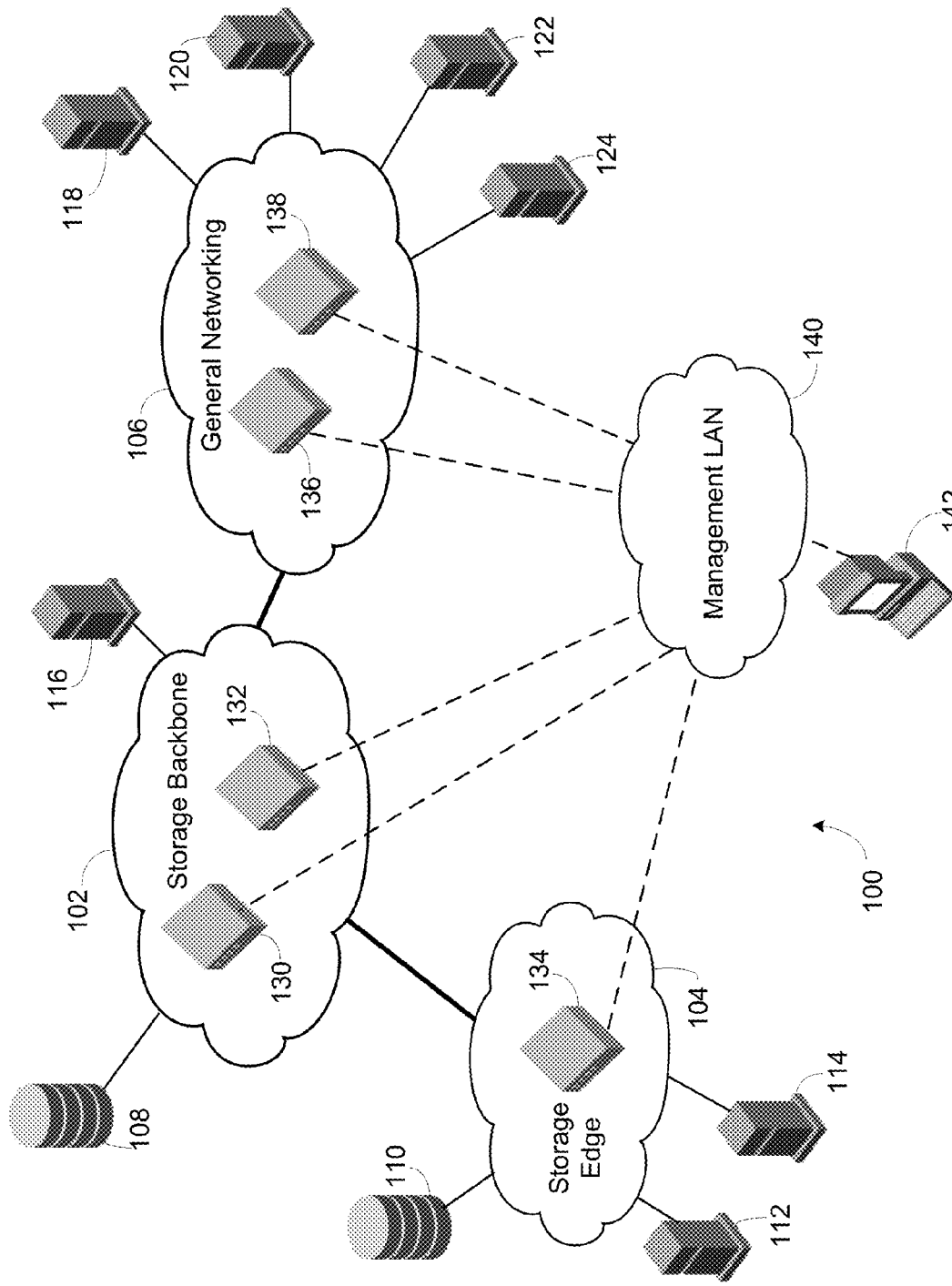
FIG. 1 is a block diagram of a network having connected storage and general networking networks and a management network according to the preferred embodiment.

Referring to FIG. 1, an exemplary network 100 for use with the present invention is illustrated. A backbone storage fabric 102 is connected to an edge storage fabric 104 and a general networking fabric 106. Preferably the storage fabrics 102 and 104 are Fibre Channel (FC) fabrics connected by a router. The general networking fabric 106 is preferably an Ethernet fabric, such as one based on VDX switches from Brocade Communications Systems, Inc., which form an Ethernet fabric as more fully disclosed in U.S. patent application Ser. No. 13/098,360, entitled "Converged Network Extension," filed Apr. 29, 2011; Ser. No. 12/725,249, entitled "Redundant Host Connection in a Routed Network," filed 16 Mar. 2010; Ser. No. 13/087,239, entitled "Virtual Cluster Switching," filed 14 Apr. 2011; Ser. No. 13/092,724, entitled "Fabric Formation for Virtual Cluster Switching," filed 22 Apr. 2011; Sr. No. 13/092,580, entitled "Distributed Configuration Management for Virtual Cluster Switching," filed 22 Apr. 2011; Ser. No. 13/042,259, entitled "Port Profile Management for Virtual Cluster Switching," filed 7 Mar. 2011; Ser. No. 13/092,460, entitled "Advanced Link Tracking for Virtual Cluster Switching," filed 22 Apr. 2011; Ser. No. 13/092,701, entitled "Virtual Port Grouping for Virtual Cluster Switching," filed 22 Apr. 2011; Ser. No. 13/092,752, entitled "Name Services for Virtual Cluster Switching," filed 22 Apr. 2011; Ser. No. 13/092,877, entitled "Traffic Management for Virtual Cluster Switching," filed 22 Apr. 2011; and Ser. No. 13/092,864, entitled "Method and System for Link Aggregation Across Multiple Switches," filed 22 Apr. 2011, all hereby incorporated by reference. The backbone fabric 102 is illustrated as having a directly connected storage unit 108 and host 116, while the edge fabric 104 has attached a storage unit no and hosts 112 and 114. The general networking fabric 106 has a series of hosts 118, 120, 122 and 124 connected. The hosts 118-124 preferably include FCoE capabilities to access the storage units 108, 110. This is an exemplary network and many other topologies can utilize the present invention, particularly networks having two interconnected, different protocols generally managed by different administrators.

The backbone fabric 102 is illustrated as being formed by two switches 130, 132, while the edge fabric 104 is formed by one switch 134. The general networking fabric 106 is illustrated as being formed by two switches 136 and 138, with one of the switches 136, 138 acting as an FCoE gateway. This is a simplified example for purposes of explanation as a normal network will include many more switches in each fabric. Each of these switches 130-138 is connected by an Ethernet link to a management LAN 140. A management station 142 is connected to the management LAN 140 to manage the switches 130-138 and thus the backbone fabric 102, edge fabric 104 and general networking fabric 106. The management station 142 can be a conventional PC running management software as described below or can be a server in a client-server management environment, with the client PCs connecting to the server to manage the network. The management station 142 includes a processor and non-volatile storage for software executed by the processor. The software causes the processor to manage the network as described herein. In the case of single PC running the software, the software causes the PC to communicate with the various switches and network elements and to provide displays as described below. In the case of a client-server environment, the server software causes the server to communicate with the various switches and network elements to obtain the relevant data. In one embodiment the server software provides web pages or the like to clients executing a browser, the web pages providing the displays and operations. In another embodiment, management software is also executing on the client PCs, with the server acting primarily as a database and the client software accessing the server database to obtain the information then provided on the client PC to produce the displays and operation described below. Therefore the operations described below operate on the appropriate computers and the screenshots are from the computer being operated by the network administrator.

Figure 2:
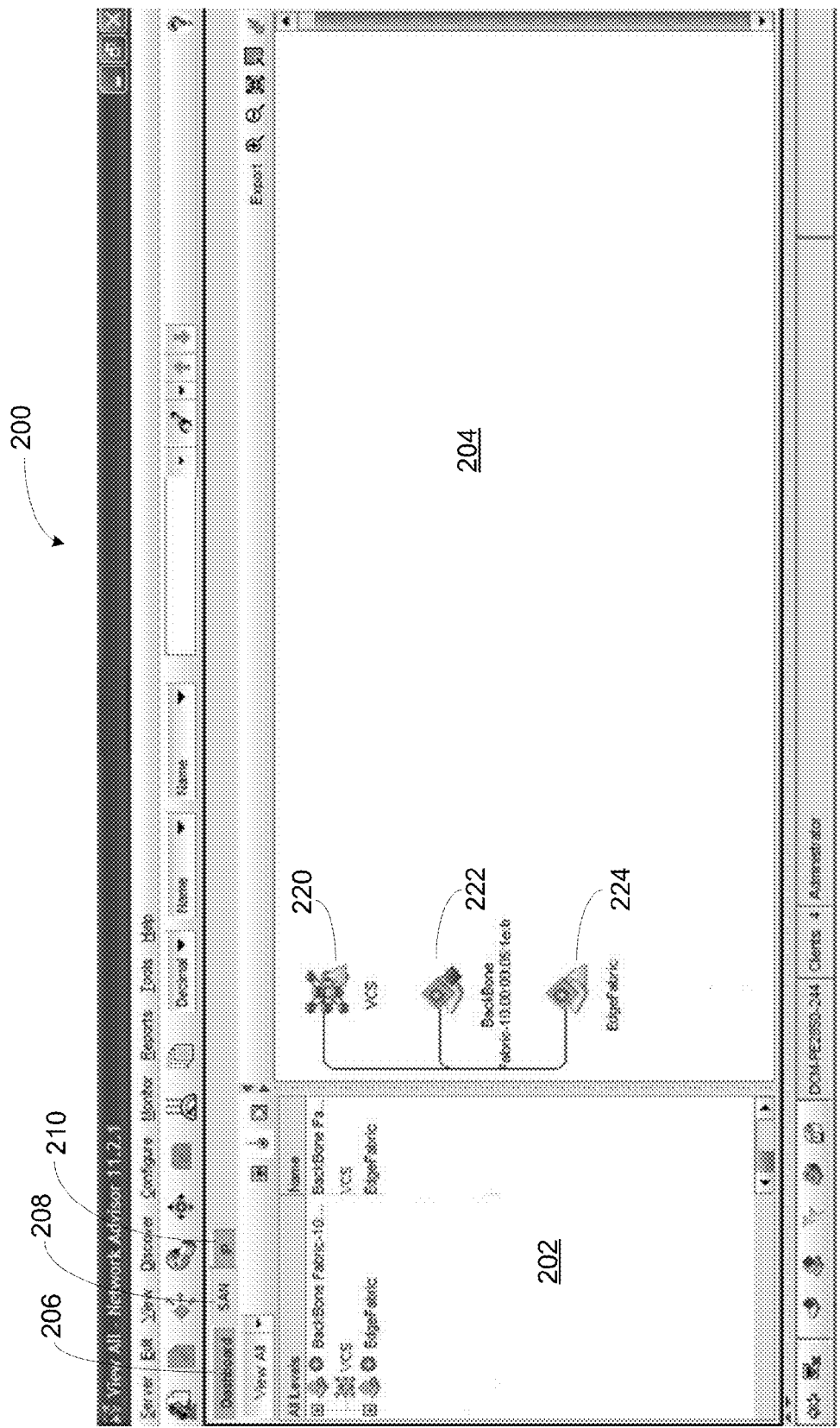
FIG. 2 is a screenshot of a graphical user interface (GUI) of the storage network of FIG. 1 according to the preferred embodiment.

Referring now to FIG. 2, a screenshot 200 of a graphical user interface (GUI) of a management station according to the preferred embodiment is shown. Two primary windows are illustrated, a tree window 202 and a topology window 204. Above the tree window 202 are tabs to select a dashboard view using a dashboard tab 206, a storage fabric view using a SAN tab 208 and a general networking view using an IP tab 210. The tree and topology windows 202 and 204 are illustrating the storage fabrics in FIG. 2. The topology window 204 is showing the storage network in fully collapsed format, with icons to represent a general networking fabric 220, a backbone fabric 222 and an edge fabric 224. Links are shown connecting the icons 220, 222 and 224 to illustrate the interconnection of the fabrics.

Figure 3:
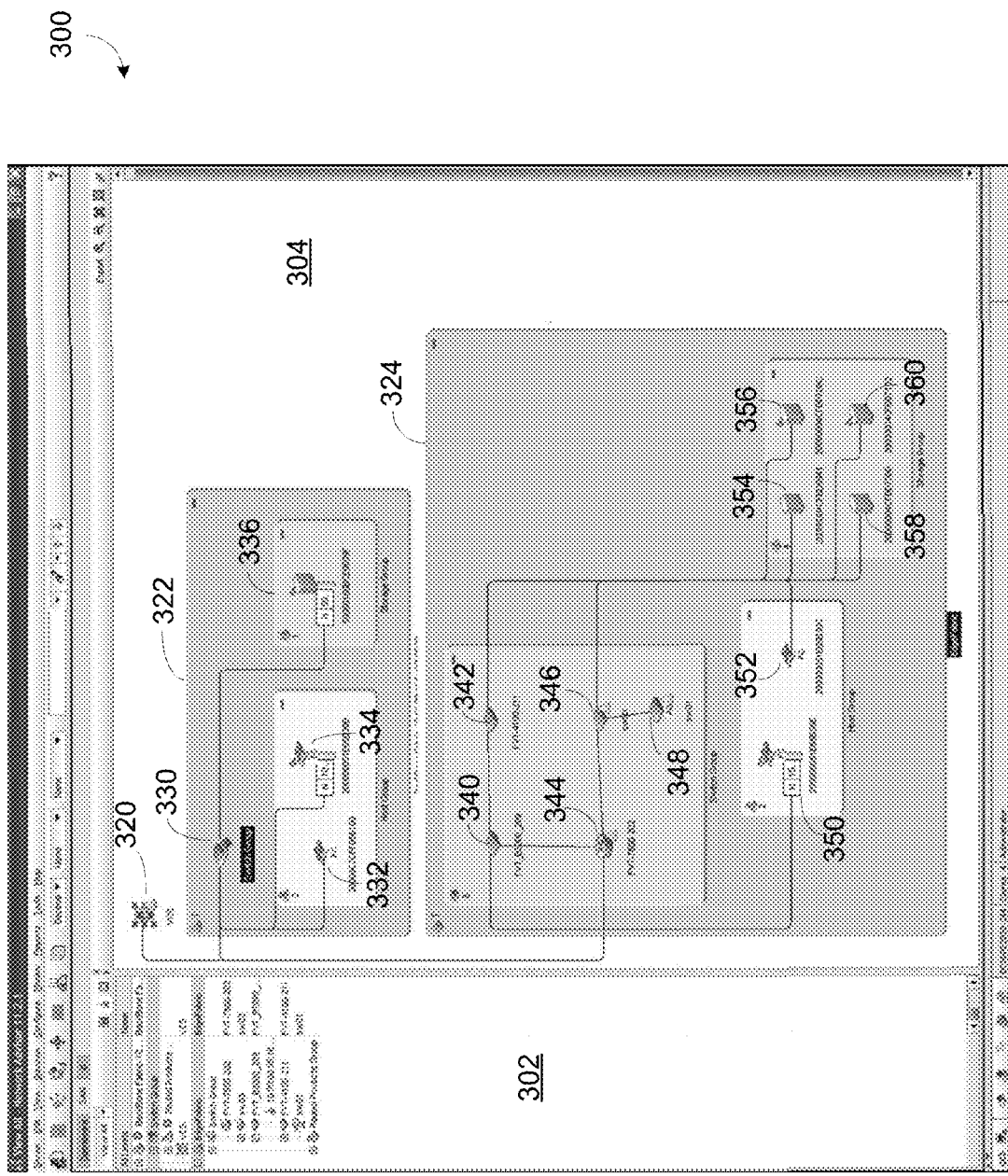
FIG. 3 is a screenshot of the GUI of FIG. 2 with the storage fabrics expanded according to the preferred embodiment.

FIG. 3 illustrates the storage network in fully expanded format. The screenshot 300 has the fully expanded tree window 302 and the fully expanded topology window 304. The backbone fabric 322 is illustrated as including a switch group 330, to which two hosts 332 and 334 and storage unit 336 are connected. The edge fabric 324 includes a router 344, switches 340, 342 and 346 and an access gateway 348. A host 350 is connected to switch 340, while a host 352 and four storage units 354-360 are connected to switches 342 and 346. The general network fabric icon 320 is not expanded as in the preferred embodiment this is a linkage icon, the components being fully displayed in another view, as described below.

Figure 4:
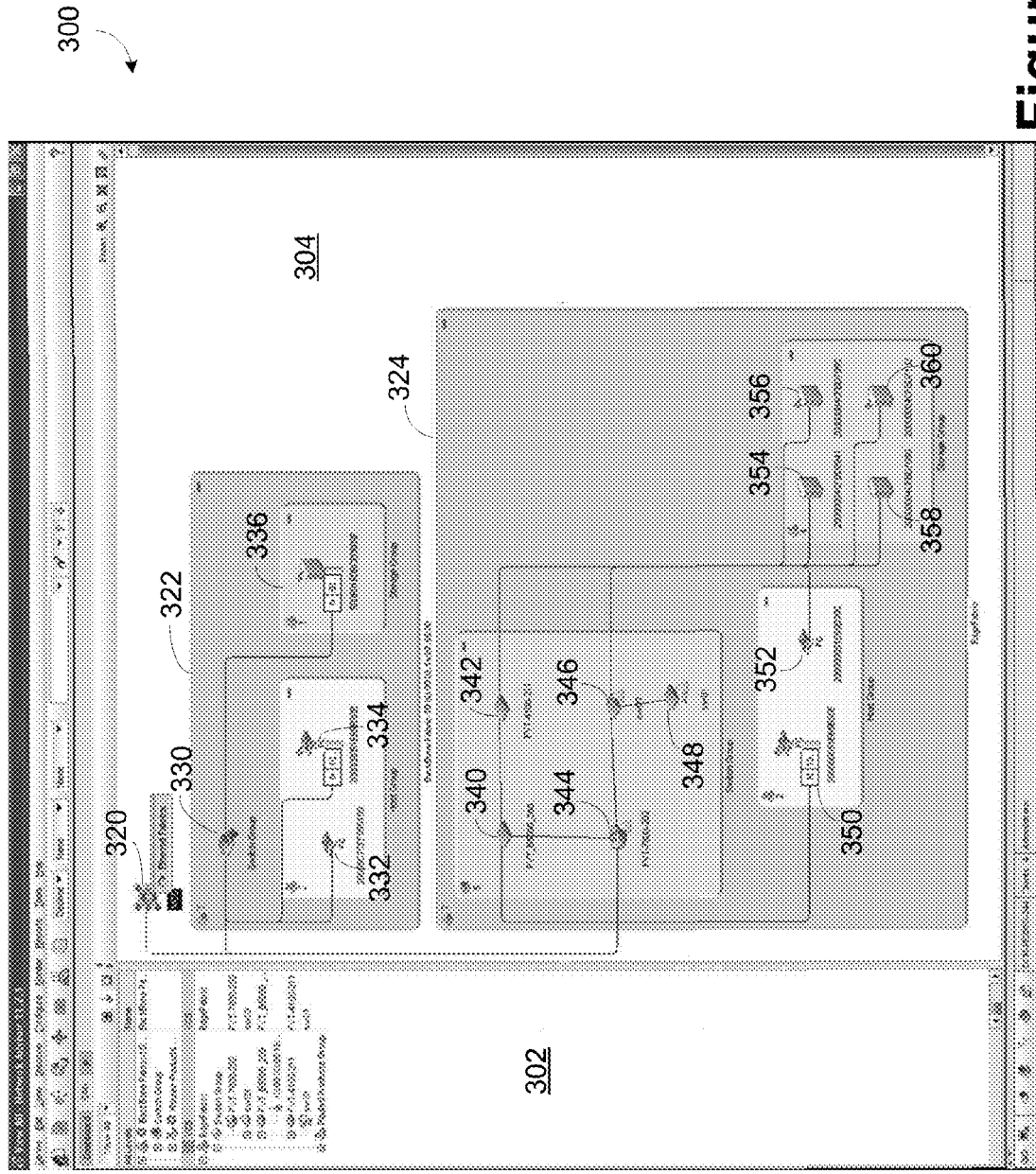
FIG. 4 is a screenshot of a portion of the GUI of FIG. 3 with a view linkage option illustrated according to the preferred embodiment.

In FIG. 4, the network administrator has moved the cursor to the general networking fabric icon 320 and right-clicked the mouse. This causes an option menu to appear. In the illustrated embodiment the only option is an Ethernet Fabrics option. Left clicking or selecting this option results in the screenshot 500 of FIG. 5 appearing.

Figure 5:
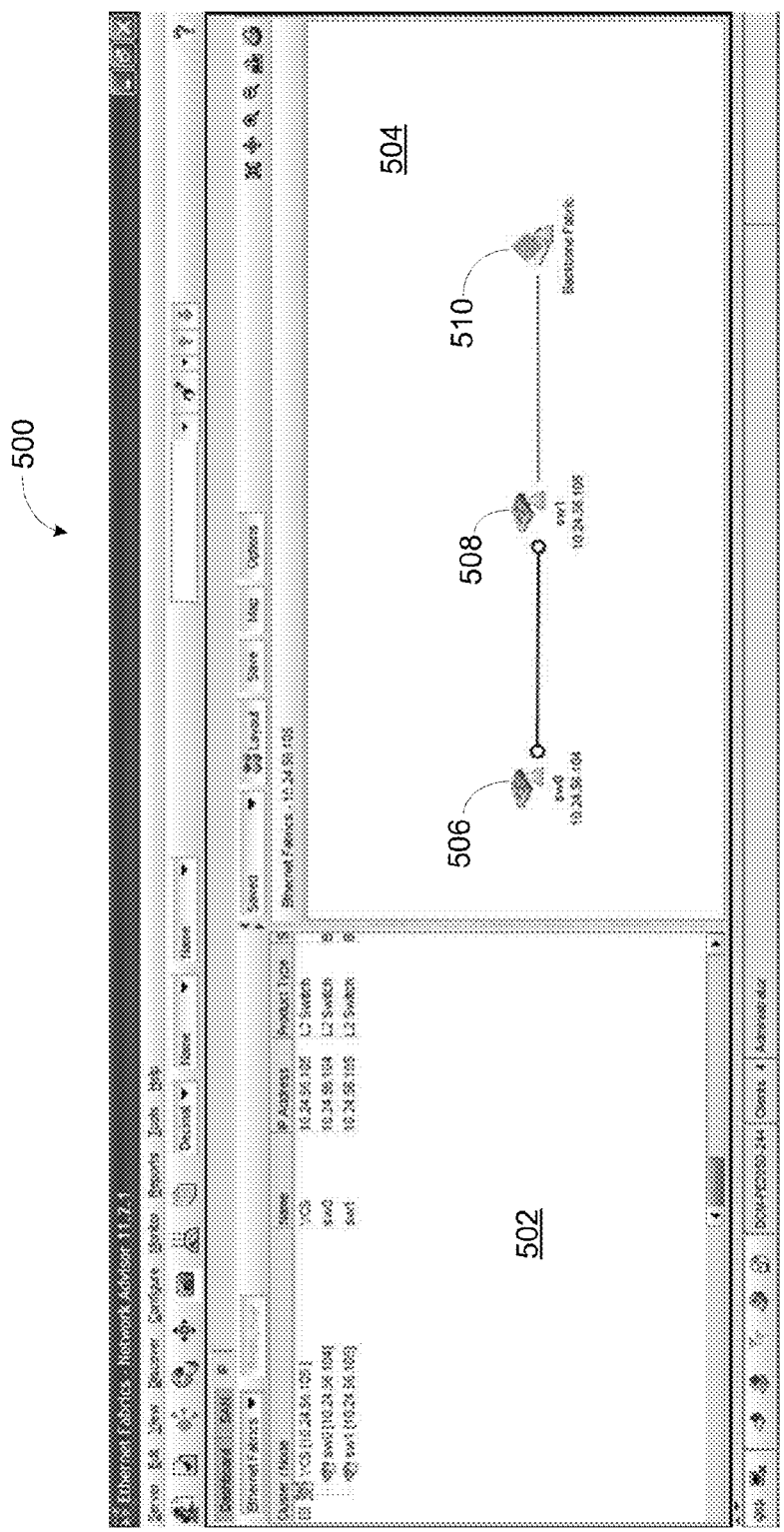
FIG. 5 is a screenshot of a GUI of the general networking fabric after selecting the view linkage of FIG. 4 according to the preferred embodiment.

FIG. 5 illustrates the screenshot 500 showing the general networking fabric view with a tree window 502 and a topology window 504. The topology window 504 illustrates two switches 506 and 508 which form the simplified general networking fabric of the illustrated embodiment. The switch 508 is connected to the backbone fabric icon 510, which represents the storage network, just as the general networking fabric icon 320 represented to the general networking fabric in the storage network video.

Figure 6:
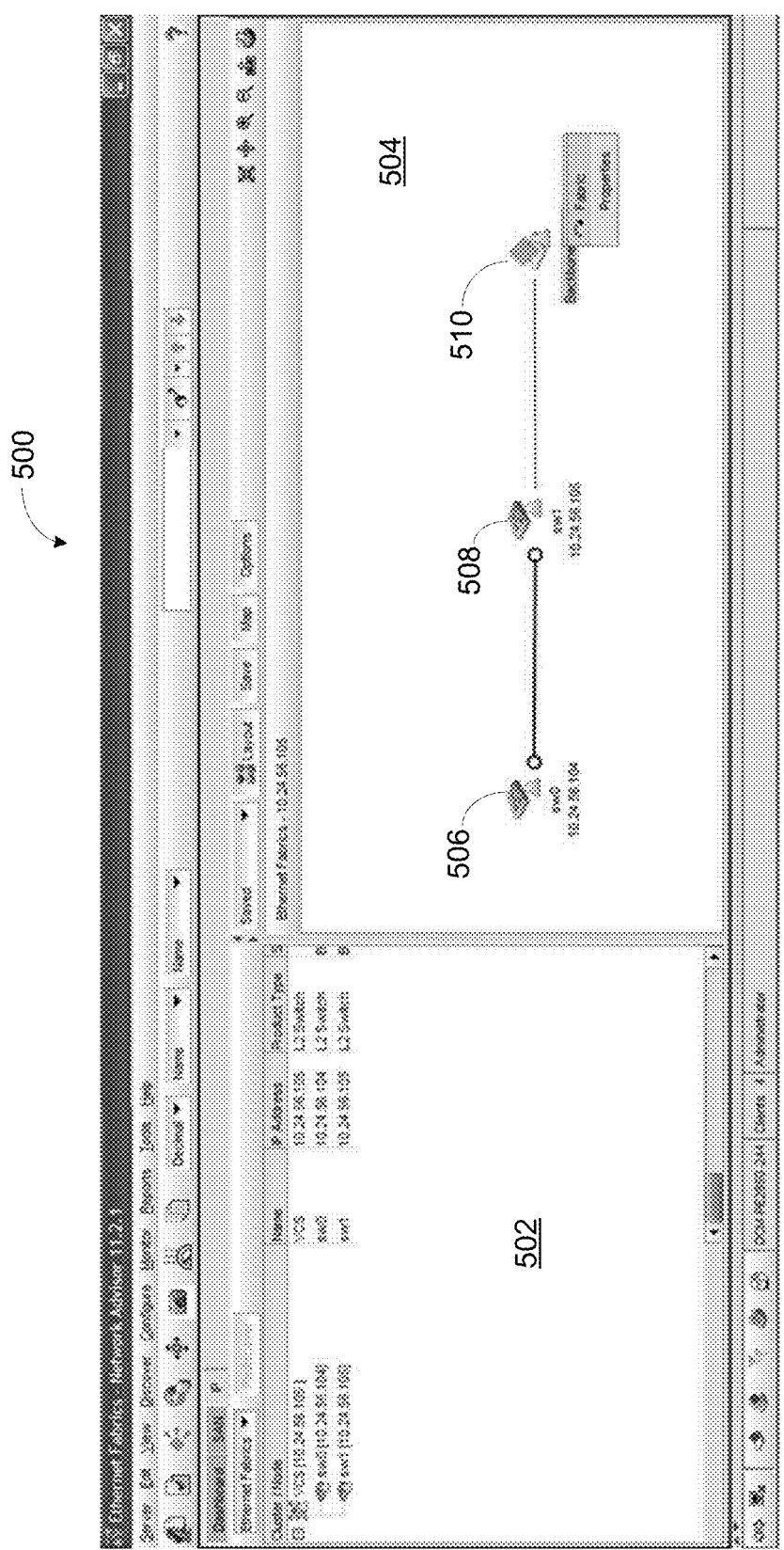
FIG. 6 is a screenshot of the GUI of FIG. 5 with a view linkage option illustrated according to the preferred embodiment.

In FIG. 6, the administrator has selected and right-clicked the backbone fabric icon 510, resulting in the option menu with options including Fabric and Properties. Left clicking on the Fabric option returns the administrator to the screenshot 300 of FIG. 3, as this completes the linkage from the general networking topology view.

Figure 7:
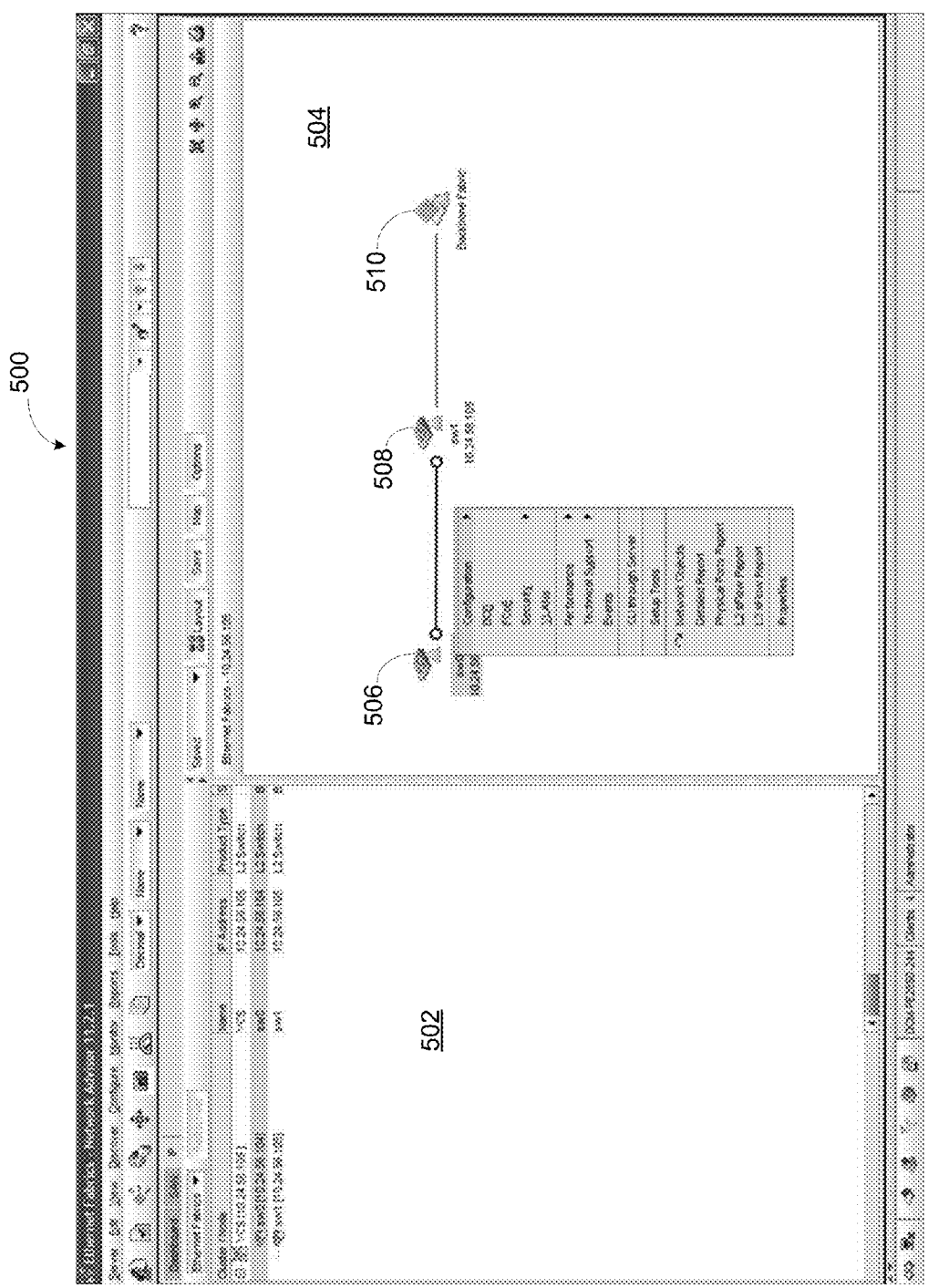
FIG. 7 is a screenshot of the general networking fabrics GUI with a switch selected and the options illustrated according to the preferred embodiment.
Figure 8:
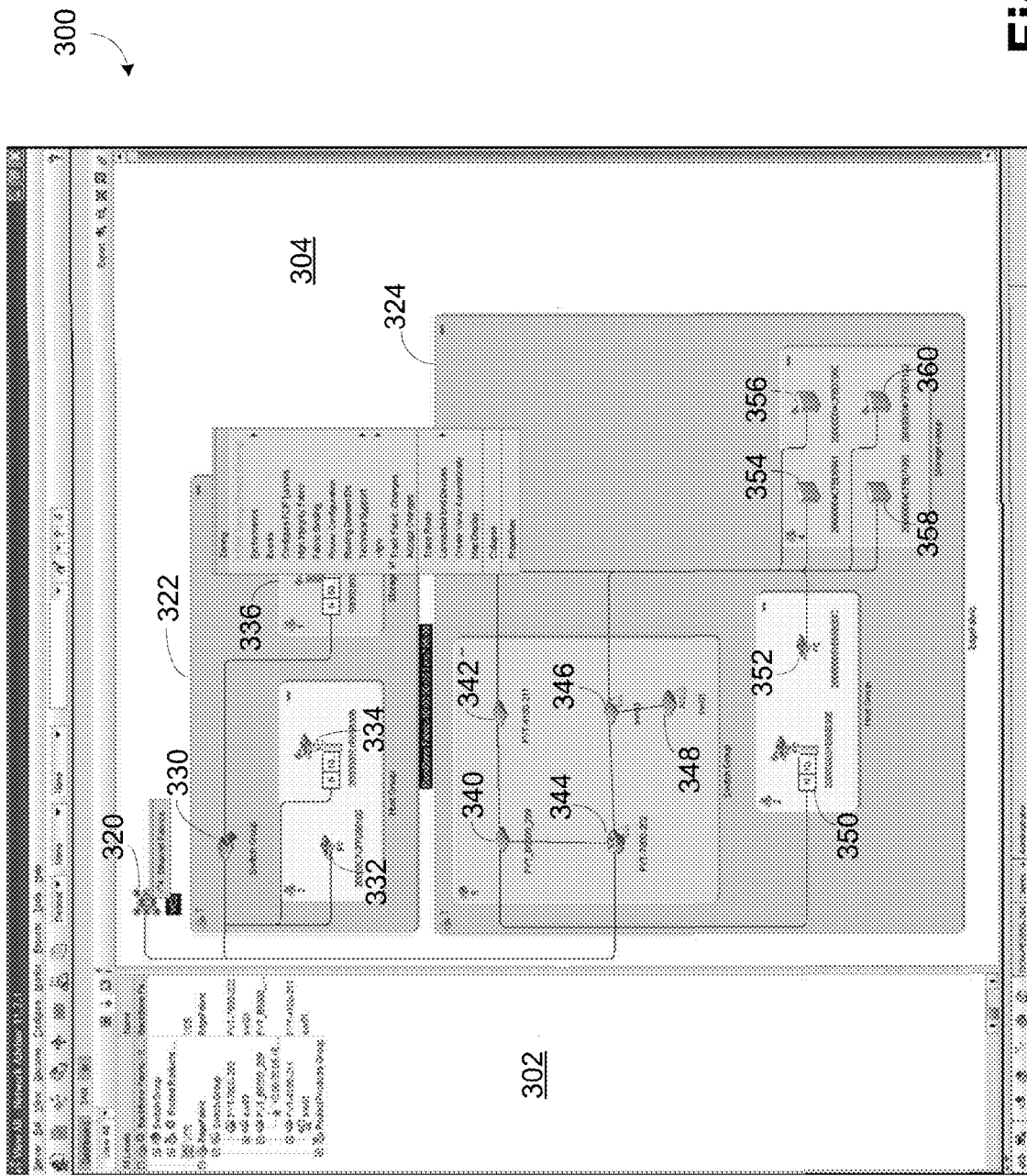
FIG. 8 is a screenshot of the storage fabrics GUI with a fabric selected and the options illustrated according to the preferred embodiment.

FIGS. 7 and 8 illustrate the differences in right-clicking on conventional switches as opposed to the linkage icons as described in FIGS. 5 and 6. FIGS. 7 and 8 show long option menus appearing as appropriate for the particular switch. This illustrates the different meaning applied to the linkage icons.

Figure 9:
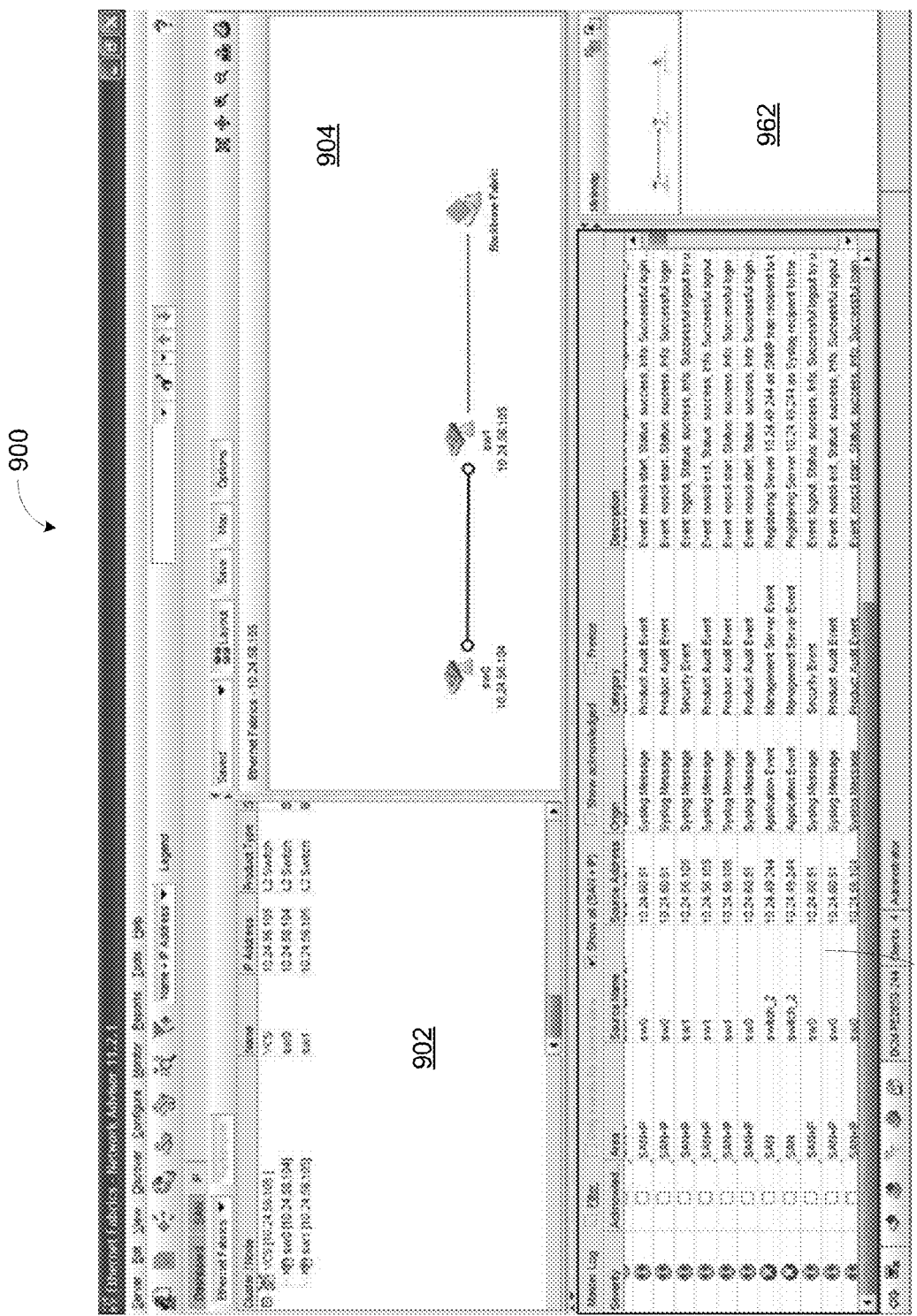
FIG. 9 is a screenshot of the general networking fabrics GUI with an event log window according to the preferred embodiment.
Figure 10:
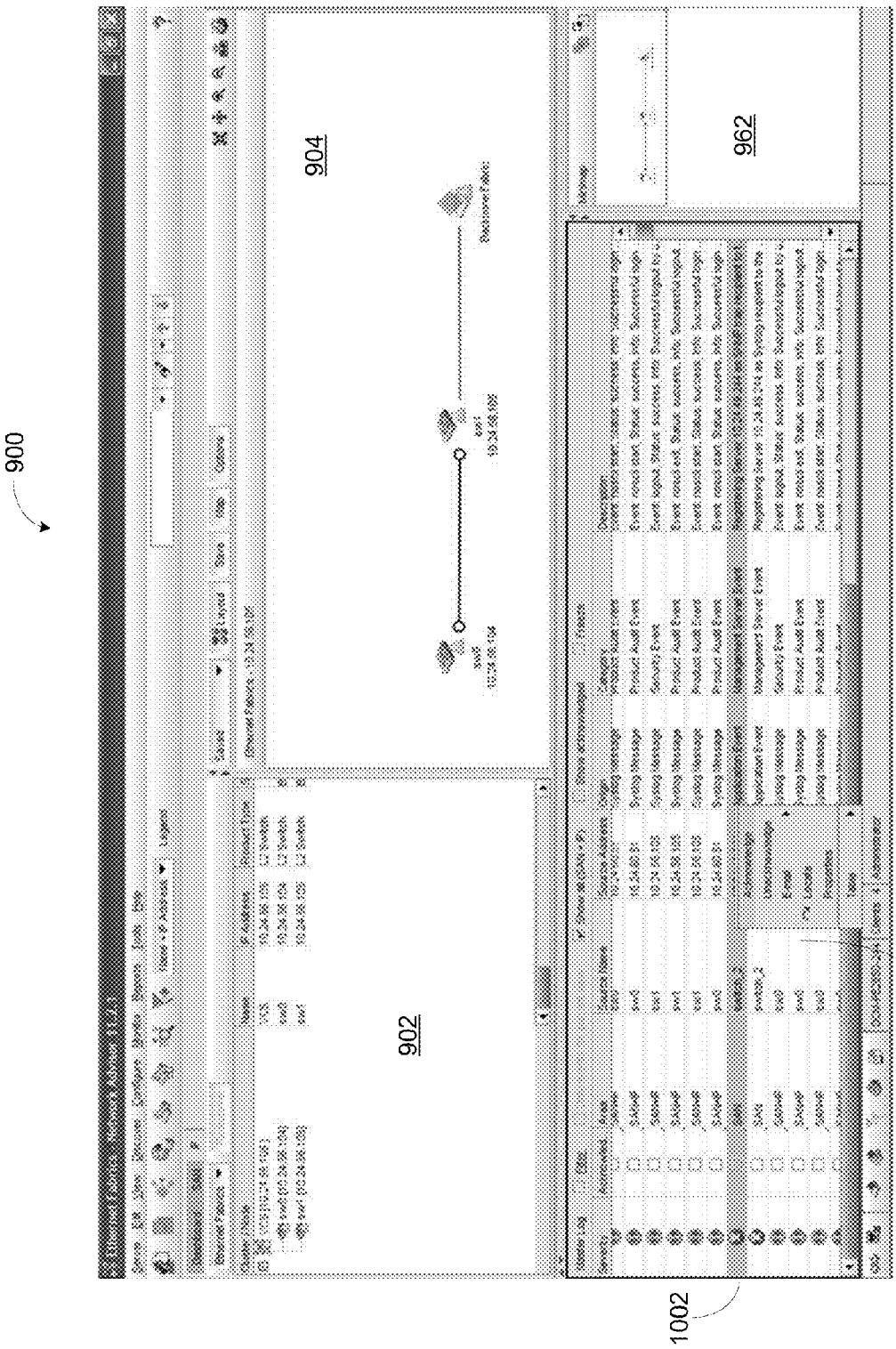
FIG. 10 is the screenshot of FIG. 9 with a log event in the storage fabrics selected and the options illustrated according to the preferred embodiment.
Figure 11:
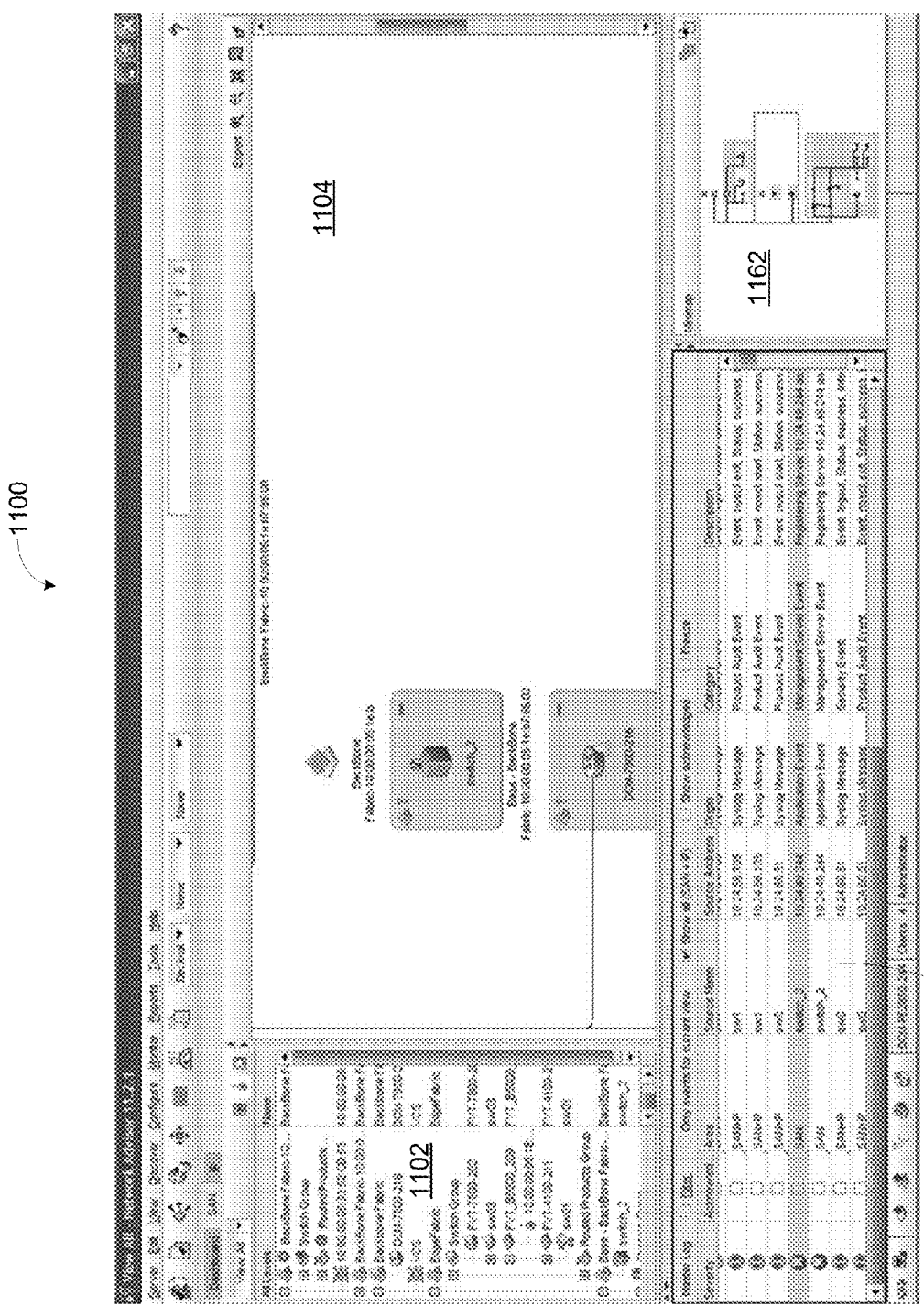
FIG. 11 is a screenshot of the storage fabrics GUI after selecting the locate option in FIG. 10 according to the preferred embodiment.

FIG. 9 shows screenshot 900. The illustrated screenshot 900 is of the general networking fabric. Additional windows of an event log window 960 and minimap window 962 are now present. The event log window 960 is a list of the most recent events and system log entries for the monitored devices. In FIG. 10 the administrator has selected a log entry 1002 related to a switch in the storage fabrics and then right-clicked on the entry to obtain an option menu. One of the options is Locate. Selecting the Locate option causes the screenshot 1100 of FIG. 11 to appear; which is a storage fabrics view. The relevant device is placed in the center of the topology window 1104. Thus, selecting the Locate option for a device in the other fabric causes the same screen change as selecting the option on the linkage icons.

Figure 12:
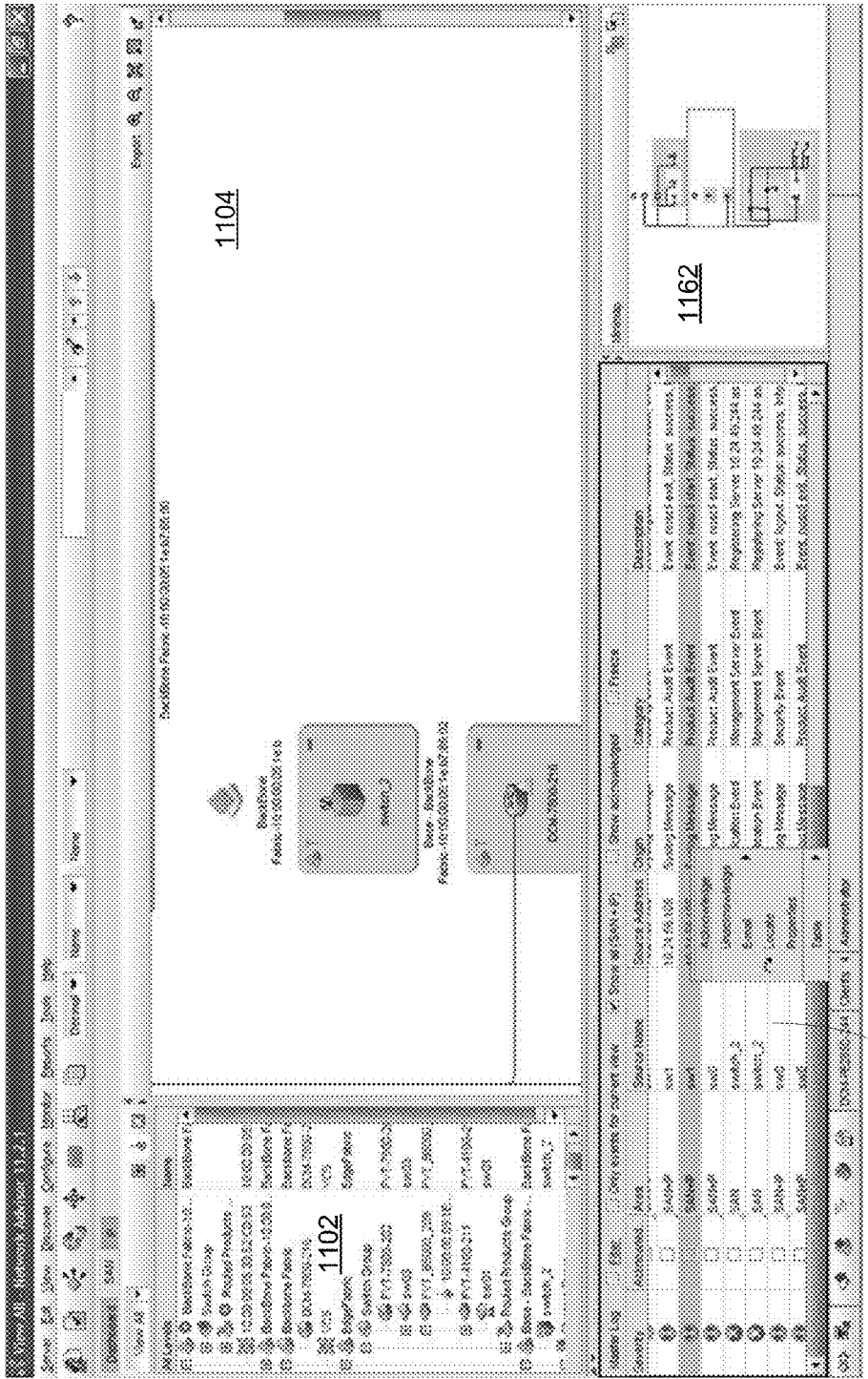
FIG. 12 is a screenshot if the storage fabrics GUI with a log event in the general networking fabrics selected and the options illustrated according to the preferred embodiment.
Figure 13:
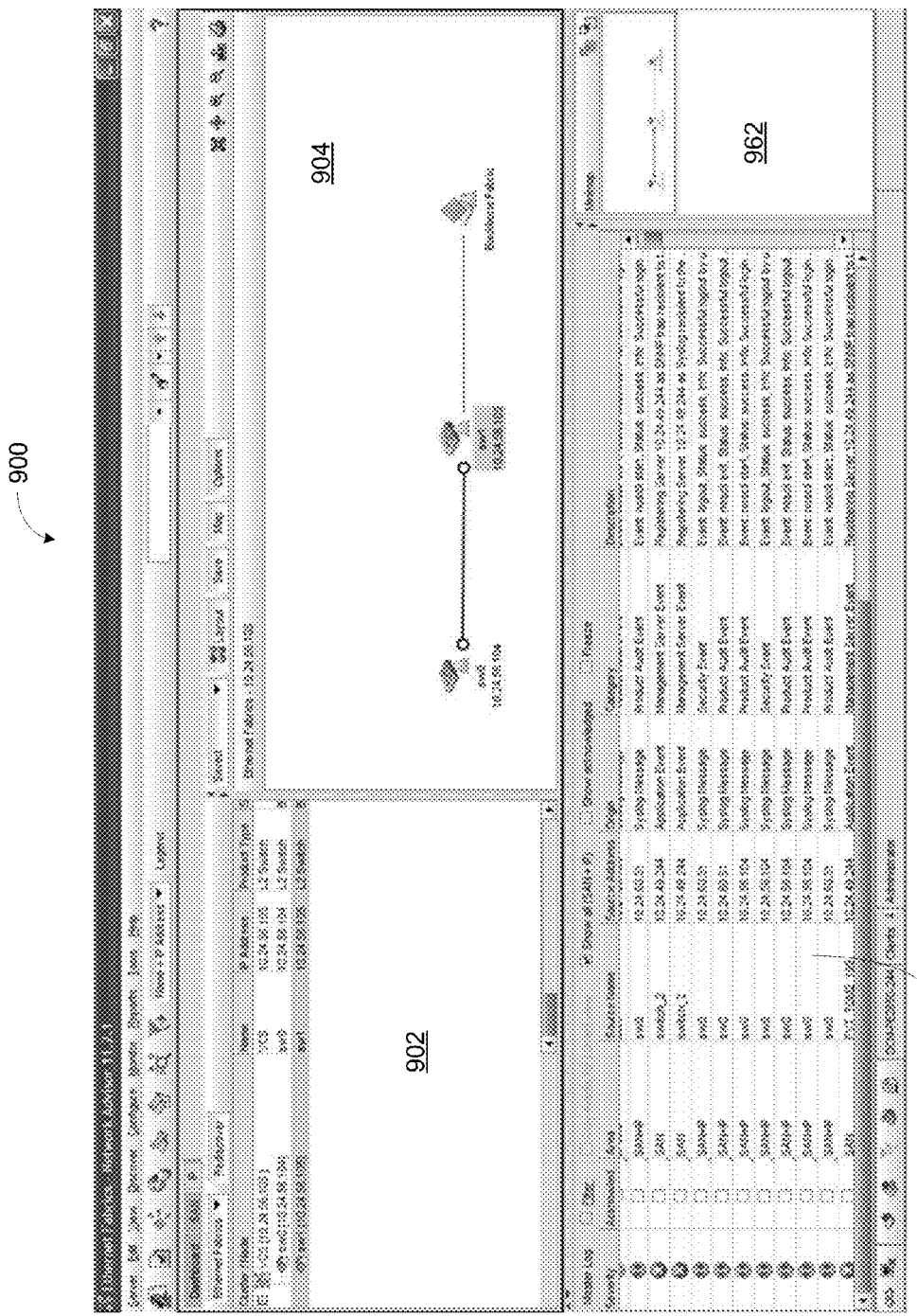
FIG. 13 is a screenshot of the general networking fabrics GUI after selecting the locate option of FIG. 12 according to the preferred embodiment.

FIG. 12 illustrates the selection of an event from a device in the general networking fabric and the options available. Left-clicking the Locate option causes the general networking view to appear as shown in FIG. 13, with the device centered and highlighted.

The use of linkage icons in the topology views or the Locate option in a log view allows the administrator to move back and forth easily between the available fabrics. The linkage icons are shown properly connected in each topology view, allowed administrators to see the alternate fabric in context of the current fabric, but without overly cluttering the view. This makes it easier to manage the network and yet allows quick access to the other portions of the network.

While Fibre Channel and Ethernet fabrics have been used as exemplary network protocols, the present invention can be used with other networks and the like, particularly when networks with different protocols are interconnected but yet need to be managed jointly for best results.

While particular icons have been used to represent the non-viewed network, it is understood that many other icons can be used, though preferably the icons are not the same as used to represent individual devices or groups to allow easier recognition of which icon is a linkage icon.

While only a single linkage has been shown in each view, it is understood that there could be multiple linkages in each view, to similar protocol networks or to different protocol networks.

While a right click to provide an option menu and then selection of an item in that option menu has been used to illustrate the linkage to the other network, it is understood that other mechanisms could be used, such as depression of a key and then selection of the linkage icon, and the present invention is not limited to any particular selection method.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A network management tool comprising:
   a computer system including a processor and memory and coupled to first and second networks; and
   software stored on said computer system and causing said computer system to perform the method including:
   providing a graphical user interface showing a first topology view of the first network, said first topology view including at least one icon representing elements of the first network and at least one linkage icon representing the second network interconnected to the first network;
   receiving a selection related to said at least one linkage icon representing the second network to indicate a desire to view the second network;
   providing a second topology view of the second network responsive to said receipt of the selection related to said at least one linkage icon representing the second network, said second topology view including at least one icon representing elements of the second network and at least one linkage icon representing the first network;
   receiving a selection related to said at least one linkage icon representing the first network to indicate a desire to view the first network;
   providing said first topology view of the first network responsive to said receipt of the selection related to said at least one linkage icon representing the first network;
   providing a log display of events relating to elements in the first network and the elements in the second network;
   receiving a selection related to an element of the second network indicate a desire to view the second network; and
   providing said second topology view of the second network responsive to said receipt of the selection related to an element of the second network.

2. The network management tool of claim 1, wherein said receiving a selection related to said at least one linkage icon representing the first network to indicate a desire to view the first network and said receiving a selection related to said at least one linkage icon representing the second network to indicate a desire to view the second network each include:
   providing an option on said graphical user interface in response to an operation on said at least one linkage icon; and
   receiving a selection of said provided option.

3. The network management tool of claim 2, wherein said operation on said at least one linkage icon includes right clicking on said at least one linkage icon.

4. The network management tool of claim 1, the method further comprising:
   receiving a selection related to an element of the first network to indicate a desire to view the first network; and
   providing said first topology view of the first network responsive to said receipt of the selection related to an element of the first network.

5. A method for managing a network, comprising:
   providing a graphical user interface showing a first topology view of a first network, said first topology view including at least one icon representing elements of the first network and at least one linkage icon representing a second network interconnected to the first network;
   receiving a selection related to said at least one linkage icon representing the second network to indicate a desire to view the second network;
   providing a second topology view of the second network responsive to said receipt of the selection related to said at least one linkage icon representing the second network, said second topology view including at least one icon representing elements of the second network and at least one linkage icon representing the first network;
   receiving a selection related to said at least one linkage icon representing the first network to indicate a desire to view the first network;
   providing said first topology view of the first network responsive to said receipt of the selection related to said at least one linkage icon representing the first network;
   providing a log display of events relating to elements in the first network and the elements in the second network;
   receiving a selection related to an element of the second network to indicate a desire to view the second network; and
   providing said second topology view of the second network responsive to said receipt of the selection related to an element of the second network.

6. The method of claim 5, wherein said receiving a selection related to said at least one linkage icon representing the first network to indicate a desire to view the first network and said receiving a selection related to said at least one linkage icon representing the second network to indicate a desire to view the second network each include:

providing an option on said graphical user interface in response to an operation on said at least one linkage icon; and receiving a selection of said provided option.

7. The method of claim 6, wherein said operation on said at least one linkage icon includes right clicking on said at least one linkage icon.

8. The method of claim 5, further comprising:

receiving a selection related to an element of the first network to indicate a desire to view the first network; and providing said first topology view of the first network responsive to said receipt of the selection related to an element of the first network.

9. A non-transitory computer-readable medium which stores a computer program to cause a computer system to perform the following method for managing a network, the method comprising:

providing a graphical user interface showing a first topology view of a first network, said first topology view including at least one icon representing elements of the first network and at least one linkage icon representing a second network interconnected to the first network;

receiving a selection related to said at least one linkage icon representing the second network to indicate a desire to view the second network;

providing a second topology view of the second network responsive to said receipt of the selection related to said at least one linkage icon representing the second network, said second topology view including at least one icon representing elements of the second network and at least one linkage icon representing the first network;

receiving a selection related to said at least one linkage icon representing the first network to indicate a desire to view the first network;

providing said first topology view of the first network responsive to said receipt of the selection related to said at least one linkage icon representing the first network;

providing a log display of events relating to elements in the first network and the elements in the second network;

receiving a selection related to an element of the second network to indicate a desire to view the second network; and providing said second topology view of the second network responsive to said receipt of the selection related to an element of the second network.

10. The non-transitory computer-readable medium of claim 9, wherein said receiving a selection related to said at least one linkage icon representing the first network to indicate a desire to view the first network and said receiving a selection related to said at least one linkage icon representing the second network to indicate a desire to view the second network each include:

providing an option on said graphical user interface in response to an operation on said at least one linkage icon; and receiving a selection of said provided option.

11. The non-transitory computer-readable medium of claim 10, wherein said operation on said at least one linkage icon includes right clicking on said at least one linkage icon.

12. The non-transitory computer-readable medium of claim 9, the method further comprising:

receiving a selection related to an element of the first network to indicate a desire to view the first network; and providing said first topology view of the first network responsive to said receipt of the selection related to an element of the first network.

\* \* \* \* \*

UNITED STATES PATENT AND TRADEMARK OFFICE
CERTIFICATE OF CORRECTION

PATENT NO.       : 8,839,113 B2                                Page 1 of 1
APPLICATION NO.  : 13/281602
DATED            : September 16, 2014
INVENTOR(S)      : David B. Hamilton et al.

It is certified that error appears in the above-identified patent and that said Letters Patent is hereby corrected as shown below:

On the Title page, please correct inventor "Naveen Konapalli" name to read -- Naveen Kondapalli --.

Signed and Sealed this
Eighteenth Day of November, 2014

Michelle K. Lee
*Deputy Director of the United States Patent and Trademark Office*